United States Patent [19]

Kamimura et al.

[11] 4,368,494

[45] Jan. 11, 1983

[54] PLAYER FOR MAGNETIC TAPE CARTRIDGE RECORDINGS

[75] Inventors: Teturo Kamimura; Masahiro Komatsubara; Shizuo Ando; Takuzi Inanaga, all of Kawagoe, Japan

[73] Assignee: Pioneer Electronic Corporation, Tokyo, Japan

[21] Appl. No.: 220,985

[22] Filed: Dec. 29, 1980

[30] Foreign Application Priority Data

Dec. 29, 1979 [JP] Japan .......................... 54-181898[U]
Dec. 29, 1979 [JP] Japan .......................... 54-181899[U]

[51] Int. Cl.³ ............................................. G11B 15/66
[52] U.S. Cl. .................................. 360/96.5; 242/198; 360/93
[58] Field of Search .................... 360/96.5, 96.6, 96.1, 360/93, 105, 137; 242/197-200, 206, 208

[56] References Cited

U.S. PATENT DOCUMENTS

| | | | |
|---|---|---|---|
| 3,627,185 | 12/1971 | Trammell | 360/93 |
| 3,870,247 | 3/1975 | Carisey | 360/96.6 |
| 3,909,845 | 9/1975 | Rothlisberger | 360/93 |
| 3,950,785 | 4/1976 | Hosaka | 360/96.6 |
| 4,069,506 | 1/1978 | Ueno | 242/199 |
| 4,257,075 | 3/1981 | Wysocki et al. | 360/93 |

FOREIGN PATENT DOCUMENTS

55-122262 9/1980 Japan .............................. 360/96.5

*Primary Examiner*—Alfred H. Eddleman
*Attorney, Agent, or Firm*—Armstrong, Nikaido, Marmelstein & Kubovcik

[57] ABSTRACT

A tape player is provided comprising at least two grooves provided in the side plate of a chassis, and a guide member provided on the side of a cartridge holder for insertion thereof into the grooves. Each of the grooves includes a horizontal portion and a vertical portion contiguous to the leading edge thereof. According to such an arrangement, the cartridge inserted in the holder is permitted to advance in a horizontal state in the chassis and move in a vertical direction at the front end of the horizontal portion. The point of turning of the cartridge holder is placed in the interior of a cartridge so that the holder is moved to a horizontal state without increasing the amount of movement thereof.

8 Claims, 5 Drawing Figures

PLAYER FOR MAGNETIC TAPE CARTRIDGE RECORDINGS

BACKGROUND OF THE INVENTION

The present invention relates to a player for magnetic tape recordings of the slot-in system (hereinafter referred to as the tape player), such as car stereophonic players.

The conventional tape player of such a tape has a mechanism that a cartridge is inserted into the interior of an associated holder, which is in turn moved vertically to a given position upon the completion of insertion of the cartridge. According to this mechanism, however, there is a need of provision of means for causing a vertical movement of the holder upon detection of the completion of insertion of the cartridge, thus resulting in the structure of the player being complicated and large-sized. In addition, only the cartridge is released for ejection. This causes that the cartridge is marred up or damaged.

The prior art player is also designed to advance a cartridge holder for a cartridge in a slantwise state and turn it to a horizontal state at the end of the advancement with a view to making the player small-sized as much as possible. In the event that the point of turning of the holder is placed on the outside of the cartridge, however, it is required to increase the amount of movement of the cartridge holder even when it is moved over the same angle range. This offers a barrier to the production of a compact player.

SUMMARY OF THE INVENTION

The present invention provides a solution to the above-mentioned problems.

An object of the present invention is therefore to provide a compact tape player which has a simplified mechanism and permits a cartridge to be easily handled with no fear of damaging it.

Another object of the present invention is to provide a compact tape player which permits a cartridge holder to be moved to a horizontal state without causing an increase in the amount of movement of the holder by placing the point of turning of the holder in the interior of a cartridge.

BRIEF DESCRIPTION OF THE DRAWINGS

Other objects and advantages of the present invention will become apparent from a reading of the following detailed explanation in conjunction with the accompanying drawings in which.

DETAILED DESCRIPTION OF THE EMBODIMENTS

Figure 1:
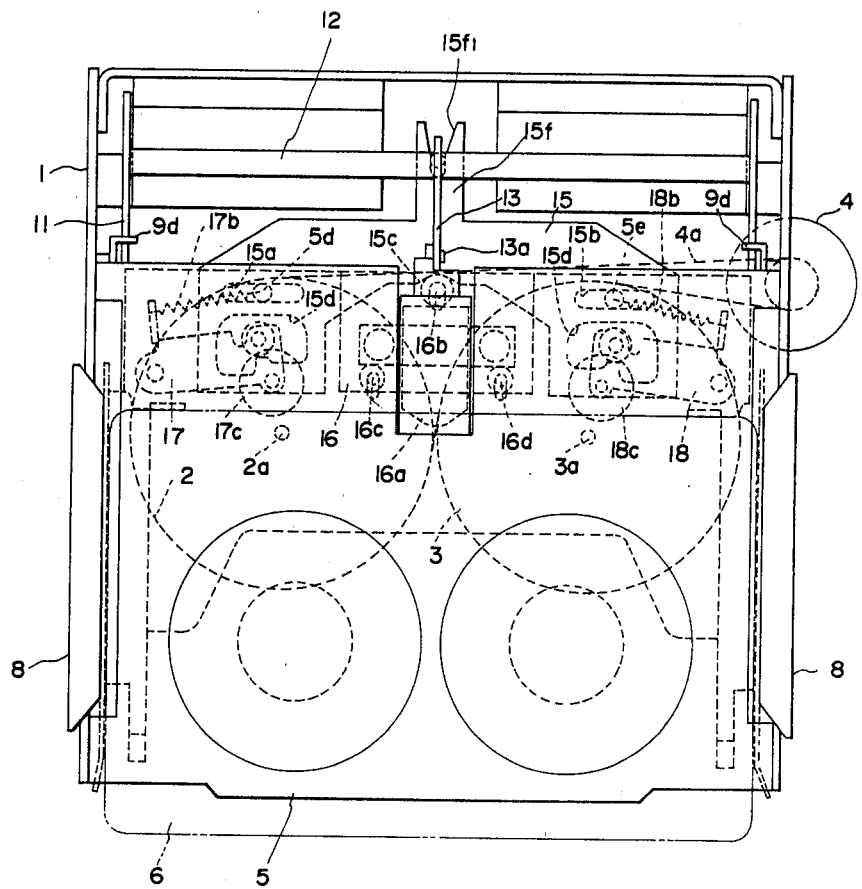
FIG. 1 is a plan view of one preferred embodiment of the present invention.
Figure 2:
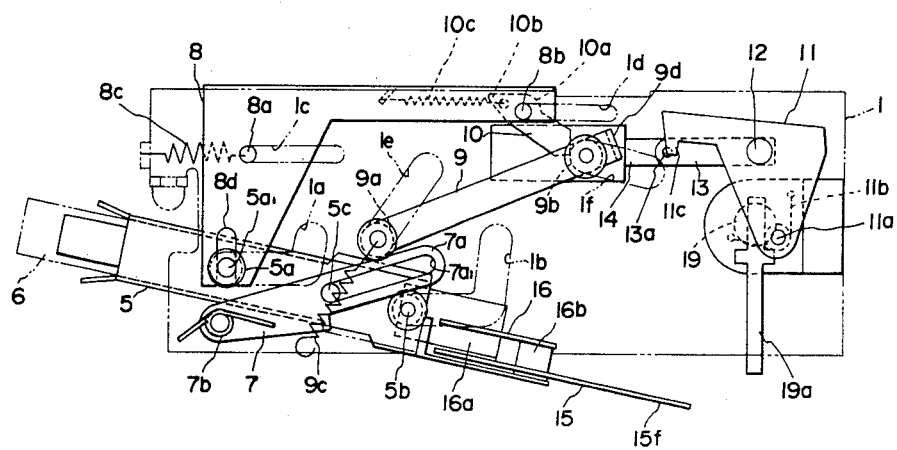
FIGS. 2 to 4 are side views of the embodiments.
Figure 4:
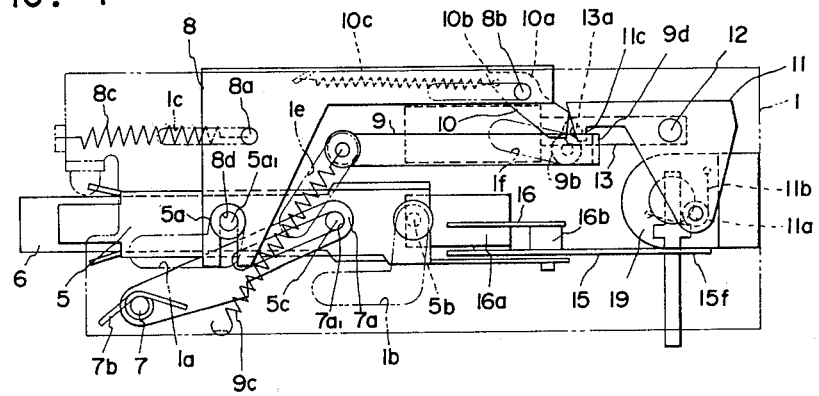

A chassis 1 is constructed in the form of a housing. Capstan shafts 2a and 3a of flywheels 2 and 3 respectively are symmetrically journalled in a mounting plate, not shown, disposed within the chassis 1. A motor 4 is affixed to the chassis 1 and is connected by a belt 4a to the flywheels 2 and 3. A cartridge holder 5 for accepting a tape cartridge 6 from outside the chassis into the same is provided, on each of opposite vertical sides facing the chassis 1, with three guide rollers 5a, 5b and 5c. The guide rollers 5a and 5b are fitted in L-shaped guide grooves 1a and 1b formed on each vertical side wall of the chassis 1 respectively. Each L-shaped guide groove has a horizontal guide portion and an ascending guide portion. The guide roller 5c is fitted in a guide groove 7a formed on a pressing plate 7 of which will be described afterward. The cartridge holder 5 is guided aslant with respect to the chassis 1 and is aligned horizontally when the guide rollers 5a and 5b reach the upper most ends of the respective guide grooves 1a and 1b. The pressing plate 7 pivoted on the side wall of the chassis 1 at one end is continuously urged by a spring 7b in the direction to close the cartridge holder 5, i.e. in the counterclockwise direction in FIG. 2. A guide groove 7a₁ is formed on an extension 7a of the pressing plate 7. Guide pins 8a and 8b affixed to a sliding plate 8 provided in a horizontally sliding engagement with the chassis are fitted in guide grooves 1c and 1b formed on the side wall of the chassis 1 respectively and are allowed to move forward and rearward, rightward and leftward in FIG. 2, along the side wall of the chassis 1. The sliding plate 8 is urged by a spring 8c extended between the chassis 1 and the guide pin 8a in the direction to eject the cartridge holder 5 toward outside the player, i.e. leftward in FIG. 2. A vertical guide groove 8d is formed on the sliding plate 8 to guide the shaft $5a_1$ of the guide roller 5a, therefore, the sliding plate 8 is allowed to advance with the forward movement of the cartridge holder 5. In other words, sliding plate 8 is in vertically sliding engagement with cartridge holder 5. An ejecting lever 9 is provided on opposite ends thereof with guide rollers 9a and 9b which are guided by guide grooves 1e and 1f formed on the side wall of the chassis 1 with an angular relationship of 120° to each other so as to allow the ejecting lever to perform approximately an arcuate movement. This arcuate movement is accomplished provided that said angular relationship is within the range of 90° to 180°. The guide roller 9a is in contact with the upper surface of the leading end of the cartridge holder 5 and is urged by a spring 9c so as to depress the leading end of the cartridge holder 5 to maintain its oblique position. A pawl 10 is pivotally mounted on the guide pin 8b and is allowed to turn in the counterclockwise direction within the arcuate range 10a whereas the turning in the clockwise direction is restricted by contact between a stopping face 10b and the upper rim of the sliding plate 8. A stopper plate 11 pivotally connected on the chassis 1 by means of a pivot 11a is urged in the clockwise direction by a spring 11b. The left and right stopper plate 11 are coupled by a coupling rod 12 as shown in FIGS. 1 and 2. A connecting lever 13 is rotatably joined with the coupling rod 12 at the center part of the coupling rod 12 and is connected at its front end to a plunger 14 of a solenoid by means of a pin 13a. The front end portion of the stopper plate 11 is formed in a hook 11c which engages with a bend 9d (FIG. 1) with the ejecting lever 9 as illustrated in FIG. 4. Guide pins 5d and 5e are affixed to the extending part of the cartridge holder 5. The guide pins 5d and 5e are guided by guide grooves 15a and 15b respectively of a cam plate 15 so as to guide the transverse movement of the cam plate 15 in FIGS. 1 and 5. A reproducing head 16a is attached to a head mount 16 provided with three guide pins 16b, 16c and 16d directing downward which are guided by guide grooves 5f, 5g and 5h formed on the extending part of the cartridge holder 5 at a leading end thereof. A cam roller 16e mounted on the guide pin 16b is pressed against a cam surface 15e of the cam plate 15 by a spring 16f. Pinch roller holders 17 and 18 are rotatably attached to the cartridge holder 5 by means of pivots 17a and 18a respectively. Said pinch roller holders carry free running pinch rollers thereon and are urged by springs 17b and 18b so as to push the pinch rollers 17c and 18c against the capstan shafts 2a and 3a respectively. Cam rollers 17d and 18d attached to pinch roller holders 17 and 18 are engaged with cam holes 15d and 15e symmetrically formed on the cam plate 15 respectively. The cam holes 15d and 15e comprise raised cam faces $15d_1$ and $15e_1$, intermediate cam faces $15d_2$ and $15e_2$, and recessed cam faces $15d_3$ and $15e_3$ respectively. With the movement of the cam plate 15, the cam rollers 17d and 18d selectively come in contact with those cam faces to control the distances between the pinch rollers 17c and 18c and the capstan shafts 2a and 3a respectively. From the central part of the rear end of the cam plate 15 is projecting an extension 15f having a slot $15f_1$ which is adapted to engage with a pendent pin 19a of a plunger 19 as the cartridge holder 5 moves from the oblique position to the horizontal position.

Figure 3:
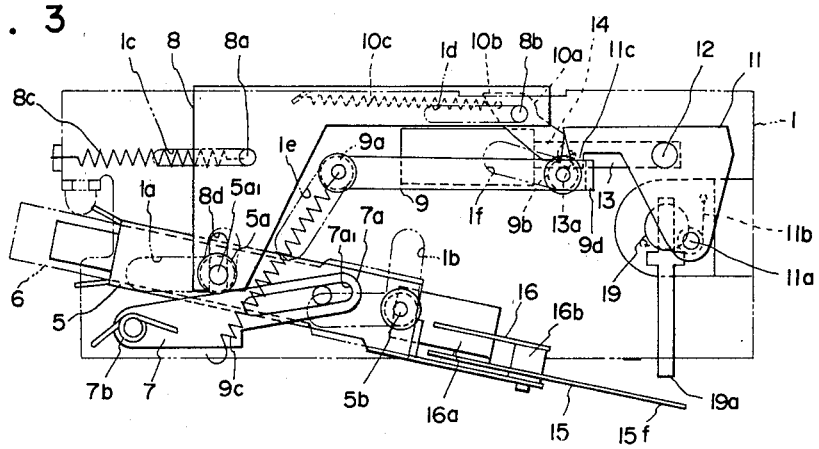

Operation of the mechanism will be described according to the above-mentioned construction. When a cartridge 6 is inserted in the cartridge holder 5 with the opening in front, and then pushed, the cartridge holder 5 is moved parallel from the position of FIG. 2 to the position of FIG. 3 keeping the same inclination as the guide rollers 5a and 5b are guided along the horizontal parts of the guide grooves 1a and 1b and the guide groove $7a_1$ of the pressing plate 7. The sliding plate 8 is advanced with the horizontal movement of the cartridge holder 5 as the shaft $5a_1$ of the guide roller 5a is fitted in the guide groove 8d of the sliding plate 8. The pawl 10 is pivotally fitted on the front guide pin 8b of the sliding plate 8 and the nose is put to the guide roller 9b of the ejecting lever 9 as shown in FIG. 2, therefore, the pawl 10 pushes the guide roller 9b toward the stopper plate 11 with the advancement of the sliding plate 8 and finally, the ejecting lever 9 is forced to move against the spring 9c to the position shown in FIG. 3 along a locus of a circular arc. When the movement of the ejecting lever 9 has been completed, the stopper plate 11 which has been turned to the position shown in FIG. 2 by the spring 11b is turned in the counterclockwise direction by the action of the plunger 14 through the connecting lever 13 and the coupling rod 12 so that the hook 11c of the stopper plate 11 engages with the bend 9d of the ejecting lever 9 to retain the ejecting lever 9 at the position shown in FIG. 3. The guide roller 9b moves downward with respect to the pawl 10 with its rightward advancement as the guide groove 1f by which the guide roller 9b is guided is declined in the direction of advancement of the guide roller 9b, however, the hook 11c engages with the bend 9d of the ejecting lever 9 before the guide roller 9b escapes from the pawl 10 as hereinafter described. When the guide rollers 5a and 5b have reached the respective ends of the horizontal portions of the guide grooves 1a and 1b respectively, the guide rollers 5a and 5b of the cartridge holder 5 are urged into the vertical portions of the guide grooves 1a and 1b respectively as the cartridge holder 5 is continuously pushed upward by the spring force of the spring 7b applied to the pressing plate 7 and the guide roller 9a which has been depressing the cartridge holder 5 has already been moved upward. Accordingly, the cartridge holder 5 is allowed to turn slightly from the slanted state shown in FIG. 3 to the horizontal state shown in FIG. 4 while the ejecting lever 9 is retained above said horizontal position. Thus when the cartridge holder 5 has been set in the horizontal position, the capstan shafts 2a and 3a are in alignment with the corresponding holes on the cartridge 6, therefore the cartridge 6 does not interfer with the capstan shafts 2a and 3a during its shift to the horizontal position allowing the capstan shafts 2a and 3a to accurately fit in the capstan shaft receiving holes on the cartridge 6. The cartridge holder 5 moves slightly forward (rightward in FIG. 3 or 4) during its transition from the slanted position shown in FIG. 3 to the horizontal position shown in FIG. 4 as the vertical portions of the guide grooves 1a and 1b are slightly inclined in the clockwise direction. Thus the capstan shafts 2a and 3a are accurately aligned with the respective centers of the capstan shaft receiving holes on the cartridge 6 when the cartridge holder 5 has been moved to the horizontal state. The sliding plate 8 and the pawl 10 also are advanced with the advancement of the cartridge holder 5 during the transition of the cartridge holder 5 from the slanted position to the horizontal position whereby the pawl 10 pushes the guide roller 9b of the ejecting lever 9 so that the guide roller 9b is made to move further forward as well as downward, and finally, the pawl 10 rides over the guide roller 9b. When the cartridge has been disposed horizontally through the process as hereinbefore described, reel shafts, not shown, descend and fit in the corresponding reel hubs of the cartridge 6 in the manner as described in detail in Japanese patent application No. 62908/79. During the transition of the cartridge holder 5 from the slanted position to the horizontal position, the extension 15f of the cam plate 15 approaches the pendent pin 19a of the plunger 19 diagonally from under the pendent pin 19a, and when the cartridge holder 5 has been perfectly aligned in the horizontal position, the slot $15f_1$ of the extension 15 engages with the pendent pin 19a as shown by long and two short dashes lines in FIGS. 4 and 5, thus completing the setting of the cartridge 6. At the completion of the setting of the cartridge 6, the head 16a has already been positioned at the REW-or FF-position, being inserted into the opening of the cartridge 6 as shown in FIG. 1. At this position, the head 16a lightly contacts the tape surface such that non-recorded areas between musical performances are detected during rewinding or fast forward winding.

Figure 5:
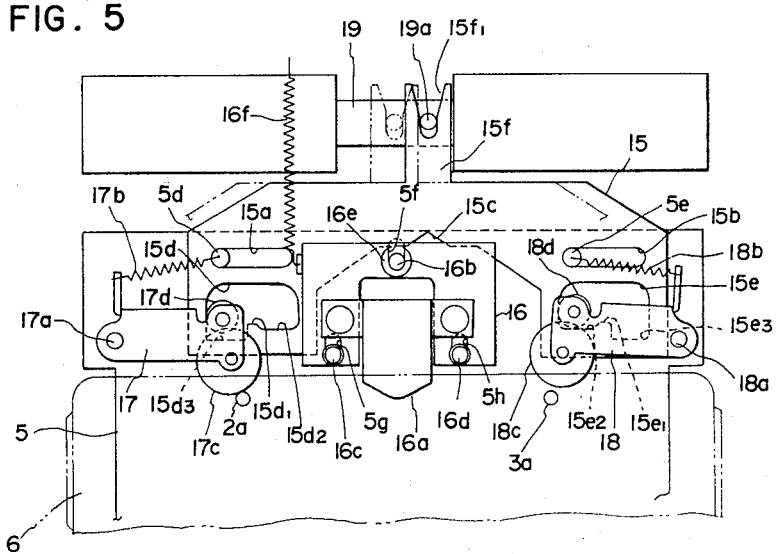
FIG. 5 is a partially plan view of the embodiment.

Referring to FIG. 5, in reproducing the records by driving the tape from the right to the left, the solenoid is energized to shift the plunger 19 from the position shown by the phantom lines to the position shown by the continuous lines. With the shifting of the plunger 19, the cam plate is moved rightward through the pendent pin 19a and the extension 15f. With the movement of the cam plate 15, the cam face 15c pushes the cam roller 16e causing the head mount 16, that is the reproducing head 16a, to be pushed against the tape surface. On the other hand, with the rightward movement of the cam plate 15, the cam rollers 17d and 18d of the pinch roller holders 17 and 18 respectively are moved from the raised cam faces $15d_1$ and $15e_1$ of the cam holes 15d and 15e to the recessed cam face $15d_3$ and the intermediate cam face $15e_2$ respectively. With the movement of the cam roller 17d to the recessed cam face $15d_3$, the pinch roller holder 17 is allowed to turn slightly in the clockwise direction under the action of the spring 17b. The recessed cam face $15d_3$ is recessed deep enough to allow the pinch roller 17c to be pressed against the capstan shaft 2a before the cam roller 17d come in contact with the recessed cam face 15d₃. With the movement of the cam roller 18a to the intermediate cam face 15e₂, the pinch roller holder 18 is allowed to turn slightly in the counterclockwise direction under the action of the spring 18b. The intermediate cam face 15e₂ is so formed that the cam roller 18d comes in contact with the intermediate cam face 15e₂ before the pinch roller 18c comes in contact with the capstan shaft 3a so that the pinch roller 18c is stopped with a small gap between the pinch roller 18c and the capstan shaft 3a (FIG. 5). Thus, with the movement of the cam plate 15, the reproducing head 16a and the pinch rollers 17c and 18c are simultaneously advanced and set to the respective operating positions, and then the tape is driven leftward and the reproducing of the records is started by supplying electricity to the motor 4. In reproducing the records by driving the tape rightward, the cam plate 15 is shifted to the left, then the component members operate in the opposite directions with respect to the directions as hereinbefore described referring to the case when the cam plate 15 is shifted to the right, however, detailed description will be omitted to avoid duplication.

The cartridge ejecting operation will be described hereunder. When an eject lever, not shown, is operated, first the solenoid is energized to actuate the plunger 19 which returns the cam plate 15 to the neutral position so that the reproducing head 16a and the pinch rollers 17c and 18c are retracted. When the solenoid including the the plunger 14 is unenergized, the stopper plate 11 is turned in the clockwise direction by the action of the spring 11b so that the hook 11c and the bend 9d of the ejecting lever 9 are disengaged. At the beginning of this disengagement when the component members are arranged as shown in FIG. 4, the guide roller 9b of the ejecting lever 9 is separated from the pawl 10, therefore, when the bend 9d is released from the hook 11c, the ejecting lever 9 is allowed to move from the position of FIG. 3 to that of FIG. 2 under the action of the expansion spring 9c. During this movement of the ejecting lever 9, the guide roller 9a pushes down the cartridge holder 5 against the lifting force of the pressing plate 7 so that the guide rollers 5a and 5b are pushed down along the respective vertical portions of the guide grooves 1a and 1b formed on the chassis 1 respectively and the cartridge holder 5 is moved to the slanted position. When the guide rollers 5a and 5b of the cartridge holder 5 have reached the lower most parts of the respective guide grooves 1a and 1b, the cartridge holder 5 is pulled by the spring 8c through the guide pin 8a, the sliding plate 8, the guide groove 8d, the shaft 5a₁ of the guide roller 5a in the ejecting direction, i.e. to the left in FIG. 3, consequently, the guide rollers 5a and 5b move along the horizontal portions of the guide grooves 1a and 1b respectively leftward thus ejecting the cartridge holder 5 as shown in FIG. 2 and facilitating the replacement of the cartridge 6. During the leftward movement of the pawl 10 together with the leftward movement of the sliding plate 8, the pawl 10 rides over the guide roller 9b as it is turned in the counterclockwise direction against the action of the spring 10c as the guide roller 9b of the ejecting lever 9 has previously been returned to the left side position. Finally, the pawl 10 is restored to the position shown in FIG. 2.

According to the present invention, the cartridge holder in which a cartridge has been housed can be advanced and moved vertically. The guide rollers are mounted on the side of the holder and guided along the guide groove formed in the side of the chassis, so that the holder is turnable around the rollers without increasing the amount of movement thereof. Thus, it is possible to obtain a compact tape player which has a simplified mechanism. Since the cartridge is removed from the player with the associated holder, there is no fear that the cartridge may be damaged.

What is claimed is:

1. A player for magnetic tape cartridge recording and playback operation comprising:
   a chassis having a main surface;
   a cartridge holder mounted for motion within said chassis and adapted to receive a tape cartridge from without said chassis at an initial oblique position with respect to the main surface;
   guide means including:
   two sets of L-shaped guide grooves in opposite side walls of said chassis, each groove including a first groove portion parallel to the main surface and a second groove portion extending from the first groove portion substantially perpendicular thereto;
   and
   two sets of guide members affixed to opposite side walls of said cartridge holder and received in the corresponding guide grooves;
   said guide means allowing said cartridge holder to be translated into said chassis to an intermediate oblique position along the first groove portions and then turned from the intermediate oblique position to a position parallel to the main surface about the trailing guide members; and
   means for biasing said cartridge holder so as to move it from the intermediate oblique position to the parallel position along the second guide groove portions.

2. The player according to claim 1 wherein said biasing means comprises:
   a pressing plate pivotally mounted at one end to said chassis and having a guide slot formed therein;
   a guide affixed to the side wall of said chassis between the guide members and received in said guide slot; and
   a spring associated with said pressing plate for biasing the pressing plate in one direction to move said cartridge holder from the intermediate to the parallel position.

3. The player according to claim 2 wherein said guide slot extends parallel to said first guide groove portions when said cartridge holder is translated from the initial to the intermediate oblique position.

4. The player according to claim 1 wherein said second groove portion is at an angle of slightly larger than 90° with respect to said first groove portion.

5. The player according to claim 1 wherein said guide member is in the form of a roller.

6. The player according to claim 1 wherein said guide member is in the form of a pin.

7. The player according to claim 2 wherein said guide is in the form of a roller.

8. The player according to claim 2 wherein said guide is in the form of a pin.

* * * * *